United States Patent
Kochevar

[15] 3,638,347
[45] Feb. 1, 1972

[54] SINKER

[72] Inventor: Rudolph J. Kochevar, 252 Arbolada Drive, Arcadia, Calif. 91006

[22] Filed: Jan. 22, 1970

[21] Appl. No.: 4,823

[52] U.S. Cl. .......................... 43/42.39, 43/42.38, 43/42.53, 43/43.14, 43/44.81, 43/44.89
[51] Int. Cl. ...................................................... A01k 85/00
[58] Field of Search ............... 43/42.39, 42.38, 42.53, 43.14, 43/44.81, 44.89

[56] References Cited

UNITED STATES PATENTS

| 2,983,068 | 5/1961 | Grayson | 43/44.89 |
| 3,322,544 | 5/1967 | Yakstis | 43/42.53 X |
| 2,540,716 | 2/1951 | Deimler | 43/42.53 X |
| 399,866 | 3/1889 | Gage | 43/44.89 |
| 2,596,457 | 5/1952 | Wulff | 43/42.53 |

Primary Examiner—Samuel Koren
Assistant Examiner—Daniel J. Leach
Attorney—Smyth, Roston & Pavitt

[57] ABSTRACT

A sinker comprising a particulate mass of sinker composition of readily manually moldable, substantially heavy material is attachable to a fishing line assembly. The sinker composition has a generally puttylike consistency and may be of the hardening or nonhardening type. A readily deformable binder may be used with the sinker composition to hold the particles together.

17 Claims, 5 Drawing Figures

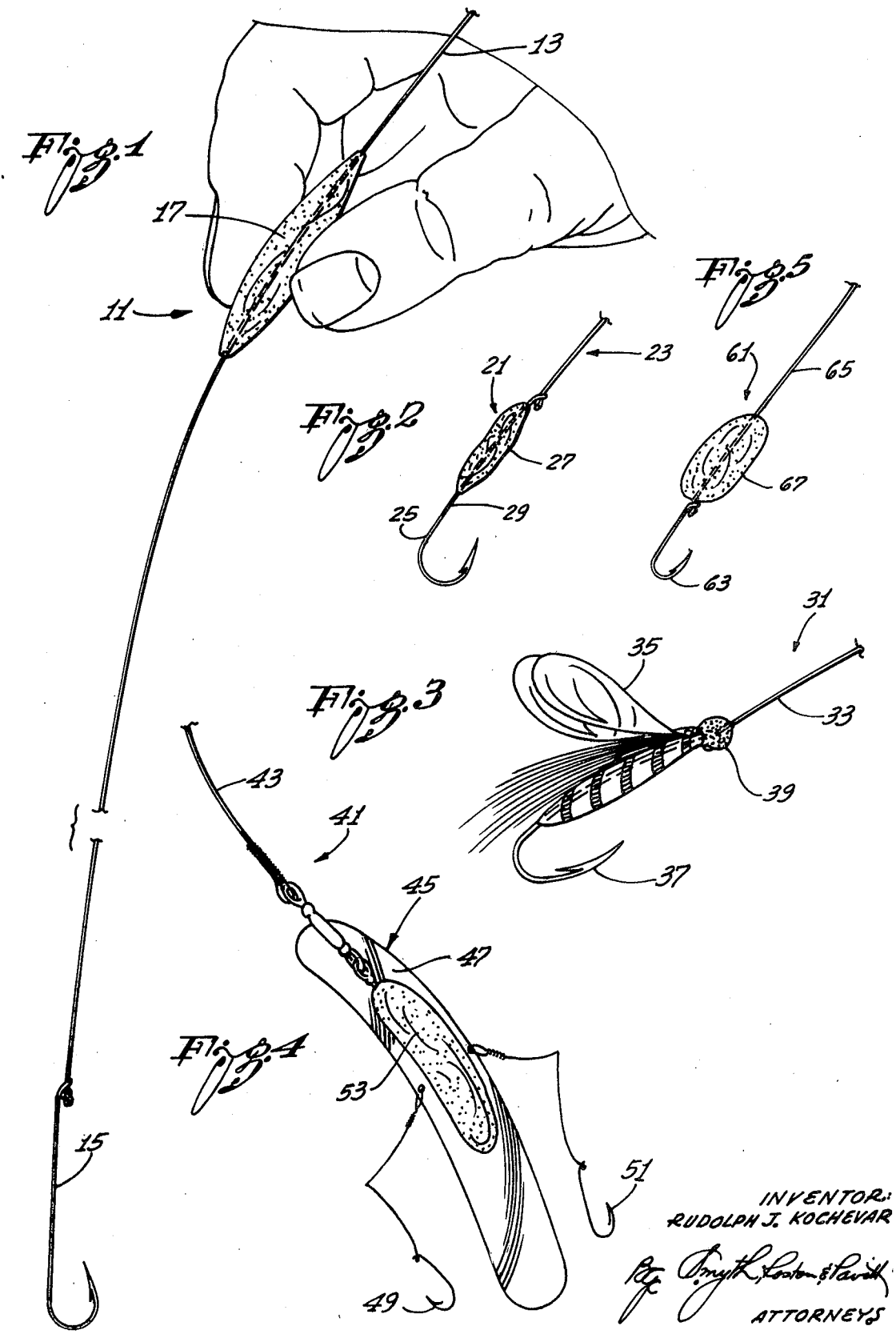

3,638,347

SINKER

BACKGROUND OF THE INVENTION

When fishing it is common practice to apply one or more sinkers to the fishing line to weight the line as necessary so that it will sink. The typical sinker is a solid metal member portions of which can be crimped with an appropriate tool to attach the sinker to the fishing line. One problem with this kind of sinker is that it often is difficult or impossible to remove the sinker from the line and reuse it. Another problem is that the sinker may become lodged between rocks, caught in weeds, or otherwise retained by elements in the water. In this event, it may become necessary to cut the fishing line with consequent loss of some fishing tackle.

Because of various factors such as the kind of fishing which is being done, the rate of flow of water at the fishing site, etc., it is often necessary to use a different amount of weight on the fishing line. This makes it necessary for the fisherman to carry a wide variety of sizes and weights of sinkers which adds to the cost of fishing and clutters up the tackle box. Another disadvantage of prior art sinkers is they cannot be used to alter the weight of the lure itself without interference with the action of the lure or without damaging the lure.

SUMMARY OF THE INVENTION

The present invention overcomes all of these disadvantages by providing a moldable sinker composition from which sinkers of any size or shape can be easily made at the fishing site. For example, the sinker composition can be provided in bulk in a suitable container in an amount greater than the largest contemplated sinker. The sinker composition is preferably of generally puttylike consistency so that the fisherman can separate the quantity needed from the remainder of the mass and apply it to any desired part or parts of the fishing line assembly. In this manner, the fisherman can weight the fishing line assembly as necessary without carrying a wide variety of sinkers. The sinker composition is manually moldable or deformable so that it can be easily applied to the fishing line assembly without the use of any tools, and there is no danger of damaging the fishing line.

The sinker composition may be of the hardening or nonhardening type. One advantage of the nonhardening type is that the sinker can be removed from the fishing line assembly and reused. Another advantage of the nonhardening type is that the sinker can deform somewhat to tend to prevent snagging of the sinker on rocks, weeds, and similar elements in the water.

The consistency of the sinker composition can be varied, but it should be sufficiently soft so that a portion of the desired weight can be easily separated from the mass and applied to a fishing line assembly. It should be readily deformable so that it can be easily manually molded on the fishing line assembly preferably without the aid of tools. However, it must be sufficiently stiff to remain on the fishing line assembly when the sinker is in actual use. The sinker of the present invention can be molded on the fishing line assembly in the sense that it can be readily shaped as desired by the fisherman. The mass of sinker composition can easily be formed or molded around the fishing line or hook to thereby tend to retain the sinker in position.

The sinker composition should be heavier than an equivalent volume of water. In addition, it must not be water-soluble. Many different compositions possessing the desired properties can be used. One preferred composition includes heavy particles held together with a readily deformable binder.

The heavy particles are preferably a metal such as lead. The metal should be finely divided so that it will not settle out. Preferably the particles should be 80 mesh or smaller. In a preferred form of the invention the particles are of varying sizes within a predetermined size range as such a powder is easier to bind together and easier to work with. By way of example, the particle sizes may vary from 80 mesh to 325 mesh with relatively large, small and medium size particles within this range being present in the composition.

The sinker can be retained on the fishing line assembly by molding or forming the sinker around the appropriate element of the fishing line assembly such as the fishing line, the fishhook, etc. In addition, the composition may be made relatively adherent so that it will adhere or tend to stick to the appropriate element of the fishing line assembly. If the sinker composition is provided with an adherent quality, it can be directly adhered to various elements of the fishing line assembly such as a lure without wrapping the sinker completely around the lure.

Another advantage of the present invention is that the sinker composition can be easily colored. By appropriate coloring and shaping of the sinker composition, an ordinary fishhook can be, in effect, converted into a lure. Alternatively, the colored sinker composition can be applied directly to a lure without destroying the colored and attractive nature of the lure.

Another advantage of the present invention is that the composition may be used to form part of a lure or to weight or alter the action of an existing lure.

The invention, both as to its organization and method of operation together with further features and advantages thereof, may best be understood by reference to the following description taken in connection with the accompanying illustrative drawing.

BRIEF DESCRIPTION OF THE DRAWING

FIG. 1 is a side elevational view of a portion of a fishing line assembly with the sinker mounted on the fishing line.

FIG. 2 is a side elevational view similar to FIG. 1 with the sinker mounted directly on the fishhook.

FIG. 3 is a fragmentary perspective view of a fishing line assembly with the sinker mounted on a fly.

FIG. 4 is a fragmentary perspective view of another fishing line assembly with the sinker adhered to a lure.

FIG. 5 is a view similar to FIG. 2 with the composition having been used to form a lure.

DESCRIPTION OF THE PREFERRED EMBODIMENTS

The four figures of the drawing illustrate, by way of example, four ways in which the sinker of the present invention may be utilized. Of course, the sinker can be used in ways other than those illustrated.

With reference to FIG. 1, there is illustrated a fishing line assembly 11. The fishing line assembly 11 includes many of the usual items of fishing equipment such as a fishing line 13 having a fishhook 15 attached to one end of the fishing line. The fishing line assembly 11 may also include numerous conventional items of equipment not illustrated such as a rod, reel, leader, and the like. The fishing line 13 and the fishhook 15 can be of any kind as the present invention is not restricted to any particular type or arrangement of fishing tackle.

A sinker 17 surrounds the fishing line 13 at a preselected location above the hook 15. The sinker 17 is easily deformable, at least when it is initially applied to the fishing line 13, so that the fisherman may cause it to assume any desired shape on the fishing line. In the embodiment illustrated, the sinker 17 is elongated and has tapered end portions; however, this is merely illustrative of one shape into which the sinker 17 can be molded. Obviously the shape of the sinker 17 can be selected to suit the needs or desires of the fisherman.

The sinker 17 can be mounted on the fishing line 13 by manually pinching off a portion of the sinker material from a larger mass of the sinker composition. The mass of sinker composition may be supplied in a suitable container (not shown). The portion of the sinker composition thus pinched off can be easily formed or molded around the fishing line 13 into any desired configuration. The weight of the sinker 17 is, of course, infinitely variable in that any quantity of the sinker composition can be selected. Of course, one or more of the sinkers 17 can be mounted on the fishing line 13.

FIG. 2 illustrates a fishing line assembly 21 which may be identical to the fishing line assembly 11 except for the position of the sinker. Thus, the fishing line assembly 21 includes a fishing line 23 and a fishhook 25 suitably tied or otherwise attached to one end of the fishing line. The fishing line assembly 21 also includes a sinker 27 which may be identical to the sinker 17 except that it is mounted directly on the fishhook 25. In the embodiment illustrated, the sinker 27 is mounted on a shank portion 29 of the fishhook 25 adjacent the fishing line 23, although it should be understood that the sinker 27 can be mounted on other portions of a fishhook, if desired.

An added advantage of the embodiment of FIG. 2 is that the sinker may be colored or may contain brightly colored particles which tend to attract the fish. In this manner the fishhook 25 is, in effect, converted into a lure.

FIG. 3 illustrates a fishing line assembly 31 which includes a fishing line 33 and a fly 35 suitably attached as by tying to one end of the fishing line 33. The fly 35 includes a hook 37. The fishing line assembly 31 also includes a sinker 39 mounted directly on the fly 35. Except for fly 35 and the position of the sinker 39, the embodiment of FIG. 3 may be identical to the embodiment of FIG. 1. In the form shown in FIG. 3, the sinker 39 is in the form of a ball near the end of the fly which is attached to the fishing line 33, it being understood that other placements and configurations of the sinker 39 may be utilized.

FIG. 4 shows a fishing line assembly 41 which includes a fishing line 43 having a lure 45 suitably attached to one end of the fishing line. The lure 45 includes a platelike member 47 which may be brightly colored and a pair of fishhooks 49 and 51 suitably attached to the member 47. The fishing line assembly 41 also includes a sinker 53 which is mounted directly on the plate member 47. Except for the lure 45 and the positioning of the sinker 53, the fishing line assembly 41 may be identical to the fishing line assembly 11.

Although the sinker 53 could extend completely around the plate member 47, in the embodiment of FIG. 4 the sinker is sufficiently sticky or adherent to adhere to one surface of the member 47. As in the embodiment of FIG. 2, the sinker 53 may be colored or contain colored particles so that the sinker does not impair the attractiveness of the lure. It should be understood that the placement of the sinkers in the embodiments of FIGS. 1–4 is merely illustrative as the sinker may be placed anywhere on the fishing line assembly where a sinker-type function is necessary or desirable to the fishing operation.

FIG. 5 shows a fishing line assembly 61 which includes a hook 63, a fishing line 65 and a lure 67 constructed of the composition of this invention. The lure 67 is mounted on the line 65 adjacent the hook 63 so that the hook 63 forms the hook of the lure. The lure 67 can be formed and mounted on the line 65 by the fisherman at the fishing site using any hardenable composition of this invention. The nonhardening composition is not suitable for this purpose if the lure is to have a platelike configuration such as that shown by way of example in FIG. 5. Of course the lure 67 can have other shapes than that shown in FIG. 5.

Although various materials having the requisite properties can be utilized for forming the sinker, it is preferred to utilize particulate material held together with a binder. The particulate material is preferably relatively heavy and may be a powdered metal such as powdered lead. The quantity of particulate matter can be varied depending upon the desired density of the sinker composition.

The binder may be any deformable material which will hold the particulate material together. Of course, the binder should be readily manually deformable and must not be soluble in water. One suitable type of binder possessing these properties is beeswax. Of course, the quantity of binder must be sufficient to bind together all the particulate matter.

Preferably, the sinker composition also includes a plasticizer to assist in keeping the sinker composition readily deformable particularly in relatively cold climates. The plasticizer may be, for example, petroleum jelly. Alternatively, minor portions of silicone, butanol and carbontetrachloride may be used as a plasticizer with the carbontetrachloride facilitating the mixing of the silicone with the beeswax binder. Of course, the plasticizer also serves to some extent as a binder in that it has some capability of retaining the powdered metal in a cohesive mass. The amount of plasticizer that is utilized can be varied depending upon the desired consistency of the sinker composition.

If it is desired that the sinker composition have adhering qualities, the sinker composition should also contain a sticky or adherent material. One such material is a natural resin known as dammar which is obtainable in a powdered form. Alternatively, Canada balsam in a solid state may also be used to provide a sticky quality to the sinker composition. The material added to provide the adhering quality also serves as a binder in that it tends to hold the particulate material together.

A suitable sinker composition may be made utilizing the following:

| Ingredient | Preferred percent by weight |
| --- | --- |
| Beeswax | 3% |
| Dammar | 3% |
| Petroleum jelly | 4% |
| Powdered lead (80 to 325 mesh) | 90% |

Of course, the proportions of these materials can be varied depending upon the results desired. Thus, the sinker composition could be made more dense by utilizing a higher proportion of powdered lead.

This sinker composition can be prepared by melting the beeswax and dammar and then mixing these two ingredients together. The mixing can be accomplished with a mechanical stirring action. The petroleum jelly is then added to the liquid beeswax and dammar solution while stirring continues to form a substantially homogeneous solution. Finally, the powdered lead is added and the sinker composition is allowed to cool to solidify the liquid component thereof. The composition should be continuously stirred while it is cooling so that the powdered metal will be distributed evenly throughout the mass.

If desired, the sinker composition set forth above may be colored. For example, this may be accomplished by using colored metal such as red lead, copper, brass, etc., for the powdered metal. Alternatively, a small quantity of dye can be added to obtain the proper color. Care should be taken so that the dye added is compatible with the particular ingredients used to form the sinker composition. Another way in which color can be obtained is to add small flakes or particles of colored material other than the powdered metal.

Another example of a suitable sinker composition can be made utilizing the following:

| Ingredient | Preferred percent by weight |
| --- | --- |
| Beeswax | 4% |
| Canada balsam in a solid state | 2% |
| Powdered lead (80 to 325 mesh) | 93% |
| Tetraethylene silicone | 0.33% |
| Butanol | 0.33% |
| Carbontetrachloride | 0.33% |

This particular sinker composition can be prepared by melting the beeswax and solid Canada balsam and then mixing these two ingredients by stirring. The tetraethylene silicone, butanol and carbontetrachloride are in liquid form and can be added to the beeswax-Canada-balsam mixture while stirring continues. Finally, the powdered metal is added and the resulting mixture is cooled while stirring continues to keep the powdered metal evenly mixed throughout the mass. The particular order of adding ingredients and of mixing is not critical; however, the powdered metal should be added last, and the stirring should be sufficient so that the mixture is homogeneous.

The two specific examples of sinker composition set forth above are of the noncuring type in that the sinker retains its readily moldable and plastic condition during use. Thus, these sinkers can readily be removed from the fishing line assembly for reuse.

The present invention is also applicable to a curable- or hardening-type sinker composition. According to a preferred form of the present invention, the curable-type sinker composition also includes particulate material and a binder. The particulate material may be, for example, powdered lead as described hereinabove in connection with the nonhardenable sinker composition. One such binder is nitrocellulose cement. In this instance, the nitrocellulose cement serves as the binder and keeps the sinker composition in puttylike or extrudable form. When the sinker composition is exposed to the air, the nitrocellulose cement cures or hardens the sinker.

Although the proportions of the ingredients can be varied, a satisfactory curable sinker composition can be made from 15 percent by weight nitrocellulose cement and 85 percent by weight of powdered lead. The nitrocellulose cement is a viscous liquid, and the powdered metal can be mixed therewith by a suitable stirring action to provide a homogenous mixture. The powdered metal should be finely divided to prevent the metal particles from settling out and is preferably between 80 and 325 mesh. The nitrocellulose cement will not harden instantly but requires some time to harden.

Another example of a curable sinker composition uses epoxy resin, polyamide resin and powdered metal such as powdered lead with the resins serving as the binder. The epoxy resin and the polyamide resin are commercially available and they are often referred to epoxy glue.

To produce this composition, powdered metal is mixed separately with each of the resins which are in liquid form. The metal is finely divided (preferably between 80 and 325 mesh) so that it will not settle out of solution and each of the resin-metal solutions must be separately contained. The fisherman can then make his own sinkers by mixing together substantially equal quantities of the two resin-metal solutions. After mixing, the resultant composition can be mounted on the fishing line assembly where further curing should be allowed to occur before putting the sinker into the water. This curing period can be of short duration such as 1 or 2 minutes; however, complete hardening of the sinker takes a longer time.

The proportions of resin to powdered metal can be varied depending upon the desired density and consistency of the composition. A relatively high percent of metal increases the density of the composition and makes the composition more viscous immediately following mixing of the two resin-metal solutions. For example, the composition may consist of 90-95 percent by weight of powdered lead and 10-5 percent by weight of resin with the resin consisting of substantially equal portions by weight of epoxy resin and polyamide resin.

Although exemplary embodiments of the invention have been shown and described, many changes, modifications and substitutions may be made by one having ordinary skill in the art without necessarily departing from the spirit and scope of this invention.

I claim:

1. A method of weighting a fishing line assembly comprising:
   providing a fishing line assembly including a plurality of members, a first of said members being a fishing line member and a second of said members being a hook member attached to the fishing line member with the hook member being adapted to catch a fish;
   providing a mass of sinker composition of readily moldable material having a puttylike consistency, said sinker composition being substantially heavier than an equivalent volume of water;
   applying at least a portion of the mass of sinker composition to at least one of said members to thereby form a sinker for the fishing line assembly with the sinker being located to cause a portion of the fishing line assembly to sink during the use of the fishing line assembly; and
   retaining the sinker on the fishing line assembly.

2. A method as defined in claim 1 wherein said step of applying includes separating a portion of the sinker composition from the mass of sinker composition and applying said portion of the sinker composition to said one member.

3. A method as defined in claim 1 wherein said sinker composition is somewhat adherent whereby the sinker tends to adhere to said one member.

4. A method as defined in claim 1 wherein said sinker composition is substantially completely manually deformable without the aid of tools.

5. A method as defined in claim 1 wherein said sinker composition includes particulate material substantially heavier than an equivalent volume of water and a hardenable binder and including allowing the binder to harden after said step of applying to thereby cause said sinker to be relatively hard.

6. A method as defined in claim 1 wherein the sinker composition includes particulate material substantially heavier than an equivalent volume of water and a readily deformable binder, said step of applying including separating said portion of sinker composition from the remainder of the mass of sinker composition and manually molding said portion of sinker composition on said one member.

7. In a fishing line assembly including a plurality of members, a first of said members being a fishing line member and a second of said members being a hook member, said hook member being attached to said fishing line member and adapted to catch fish, the improvement comprising:
   a sinker on one of said members, said sinker being heavier than an equivalent volume of water, said sinker being mounted on one of said members at a location to cause at least a portion of the fishing line assembly to sink when in use, said sinker being of generally puttylike consistency and readily manually moldable when it is mounted on said one member.

8. An improvement as defined in claim 7 wherein said sinker is substantially noncuring and remains of substantially puttylike consistency for a substantial period of time without substantial hardening thereof.

9. An improvement as defined in claim 7 wherein the sinker is relatively sticky to facilitate mounting of the sinker on said one member.

10. In a fishing line assembly including a plurality of members, a first of said members being a fishing line member and a second of said members being a hook member, said hook member being attached to said fishing line member and adapted to catch fish, the improvement comprising:
   a manually moldable sinker on one of said members, said sinker including particulate metal substantially heavier than an equivalent volume of water held together by a binder, said binder at least initially being readily deformable to facilitate mounting of the sinker on said one member.

11. An improvement as defined in claim 10 wherein the metal includes powdered lead.

12. An improvement as defined in claim 10 wherein the sinker includes a plasticizer to assist in keeping the sinker deformable at relatively low temperatures.

13. An improvement as defined in claim 10 wherein at least a portion of said sinker is brightly colored.

14. In a fishing line assembly including a plurality of members, a first of said members being a fishing line member and a second of said members being a hook member, said hook member being attached to said fishing line member and adapted to catch fish, the improvement comprising:
   a lure on one of said members, at least a portion of said lure including particulate material heavier than an equivalent volume of water held together by a binder, said binder being readily deformable at least when said portion of said lure is mounted on the fishing line assembly to thereby permit forming of said portion of the lure at the fishing site.

15. A method as defined in claim 1 wherein said sinker composition includes a metal in particulate form held together by a deformable binder.

16. An improvement as set forth in claim 10 wherein the sinker is noncuring and remains manually moldable for a substantial period of time.

17. An improvement as defined in claim 16 wherein the metal includes powdered lead and the binder includes beeswax.

* * * * *